United States Patent Office

3,562,387
Patented Feb. 9, 1971

3,562,387
MINK VIRUS ENTERITIS VACCINE AND METHOD
FOR THE PRODUCTION THEREOF
Lloyd H. Lauerman, Jr., Middleton, Wis., assignor, by mesne assignments, to The Mogul Corporation, a corporation of Ohio
No Drawing. Filed Dec. 1, 1967, Ser. No. 687,152
Int. Cl. C12k 5/00, 7/00, 9/00
U.S. Cl. 424—89
10 Claims

ABSTRACT OF THE DISCLOSURE

A vaccine for protecting the Mustelidae family against virus enteritis and the Felidae family against panleukopenia. The vaccine is prepared ffrom mink enteritis virus propagated in kitten kidney tissue cultures. The tissue-culture propagated mink enteritis virus is harvested in one to six days after cell infection, and then inactivated.

BACKGROUND OF THE INVENTION (a) Field of the invention

This invention relates generally to animal vaccines, and more particularly to mink virus enteritis vaccine and the method of producing same.

(b) Description of the prior art

In 1952, observations were documented by C. G. Wills (Notes on Infectious Enteritis of Mink and Its Relationship to Feline Enteritis, Canad. J. Comp. Med. 16: 419–20, 1952) which led to the conclusion that the virus causing enteritis in mink was antigenically similar to the virus of infectious feline enteritis (feline panleukopenia).

The establishment of an immunologic relationship between feline panleukopenia and mink virus enteritis led to the development of a pathogenic panleukopenia vaccine which could be administered subcutaneously or orally for the control of mink virus enteritis. (Burger, The Relationship of Mink Virus Enteritis to Feline Panleukopenia Virus, Washington State Univ., Thesis, 1961). This vaccine is, however, difficult to obtain in volume and quantitate because susceptible cats or other hosts must be used for its preparation and titration.

For years attempts were made to adapt feline panleukopenia to a convenient laboratory procedure using tissue cultures and common laboratory animals, without success. (Gorham, et. al., The Preliminary Use of Attenuated Feline Panleukopenia Virus to Protect Cats Against Panleukopenia and Mink Against Virus Enteritis, The Cornell Veterinarian, Vol. LV: No. 4, October 1965).

In the last several years, Phillip's Roxane, Inc. has developed a method of propagating panleukopenia virus in tissue culture, however, for some unexplained reason, the growth of the panleukopenia virus must first take place within a tissue culture of the infected animal and only then can be passed in other tissue cultures. (U.S. Patent No. 3,293,130 (1966). Panleukopenia Vaccine and Method for the Production Thereof.)

SUMMARY OF THE INVENTION

Since mink enteritis virus is the specific cause of virus enteritis of mink, it is thus the most specific antigen for protecting mink. Accordingly, my invention comprises basically the production of mink enteritis vaccine from tissue-cultured, killed mink enteritis virus.

My invention has the advantage over known mink virus enteritis referred to in the description of the prior art above in that my vaccine is prepared from tissue culture propagated mink enteritis virus, thus, there are less extraneous tissue antigens. Furthermore, since the virus may be propagated in the tissue of a heterologous host such as, kitten tissue, the mink tissue antigens are eliminated.

The inactivated tissue culture propagated virus vaccine of my invention is more antigenic per infective virus particle than virus vaccine prepared from diseased mink tissue.

The virus and tissue culture propagation procedure utilizes animal serum that has been determined non-inhibitory to mink enteritis virus growth. Examples of non-inhibitory sera are lamb and fetal calf.

My mink enteritis vaccine may be produced more economically and faster because the tissue culture propagated mink enteritis virus may be harvested in about one to six days after cell infection rather than from about ten to twenty days as in the above noted prior art patent. It may be used both to protect the Mustelidae family against mink enteritis virus and the Felidae family against panleukopenia.

DESCRIPTION OF THE PREFERRED EMBODIMENTS

In the preparation of the virus a healthy susceptible mink is first infected with mink enteritis virus. Tissues of the infected mink are collected after the mink shows clinical signs of the disease which usually occur in about four to six days after infection. These infected mink tissues are ground up in a blender or colloidal mill as a 10 to 50 percent tissue suspension. The suspension is centrifuged at about 2500 r.p.m. for about 10 to 20 minutes and the supernatant containing the virus used as the seed stock for infection of the tissue cultures.

Having determined by experiment that kitten cells are more susceptible to mink enteritis virus than adult cat cells in tissue culture, tissue culture are prepared from the kidneys of healthy kittens. An example of a kitten kidney tissue culture is as follows: The kidneys are removed aseptically from an euthanized, previously healthy kitten. The kidneys are then washed in Eagles' minimum essential medium (pH adjusted to 7.4), the capsule removed and the cortical portion harvested. The cortical fragments are collected in a petri dish, again washed with Eagles' minimum essential medium, drained and minced.

The cortical pulp is transferred to a trypsinizing flask containing a magnetic bar and 0.25% trypsin solution (approx. 50 ml./pair of kidneys). The suspension is agitated on a magnetic stirrer at room temperature for about 45–60 minutes and the liberated cells are poured off. This trypsinizing procedure is repeated until substantially all of the cell clumps are digested.

Lamb serum is added to the trypsinized cell suspension at 1 to 10 ratio to begin trypsin inactivation and the suspension is then centrifuged at about 800 r.p.m. for about 10 minutes and the supernatant discarded. The cells are resuspended and rinsed in growth medium consisting of Eagles' minimum essential medium and 10 percent lamb serum and recentrifuged at 800 r.p.m. for 10 minutes. The supernatant is discarded and the cells resuspended in the growth medium at 1 part packed cell volume to about 200 to 400 parts growth medium.

This cell suspension is then dispensed into 16 ounce bottles at 30 ml. per bottle and incubated at about 37° C. for about three to four days, at which time the bottom surface of the bottle is usually more than 50 percent grown over by kitten kidney cells. The cells are infected with the mink enteritis virus when the cell sheet is between 50 and 99 percent grown out.

While I have described the preparation of kitten kidney tissue culture, it is understood that tissue cultures may be utilized which are prepared from the viscera of other animals of the Felidae (cat) family and of the Mustelidae (mink) and Procyonidae (racoon) families.

The virus seed should have a virus concentration of about $10^4$ to $10^6$ $ID_{50}$ per ml. and 10 ml. of virus seed is put in the kitten kidney tissue culture bottles to infect the cells at about 37° C. for an incubation period of about one to three hours. The seed virus is poured off after the cell infection period and the monolayers fed with 30 ml. of maintenance medium consisting of Eagle's minimum essential medium and 3 percent lamb serum. The mink enteritis virus infected kitten kidney tissue cultures are incubated at about 37° C. for one to six days. The virus containing fluids are pooled after two rapid freeze and thaw cycles.

Virus titers of the pooled mink enteritis virus infected kitten kidnew tissue culture fluids are determined by the direct fluorescent antibody procedure.

The vaccine is prepared from the mink enteritis virus laden tissue culture fluids by the following procedure. Formaldehyde is added to the fluids to produce a 0.3 percent concentration and pH adjusted to 7 with 4 N NaOH. These fluids are put in the incubator at 37° C. with intermittent stirring for about 24 to 48 hrs. The virus inactivated fluids are then refrigerated until further processing. The fluids are diluted so that the final vaccine, as a single product or a combination product, contains greater than $10^{2.75}$ virus particles per ml. Alum potassium adjuvant is added to a concentration of 0.7 percent and the pH adjusted to 7 for the single product and to 6 for the mink enteritis virus and botulism toxoid combined product.

To provide a fuller understanding of my invention, reference will now be had to certain of the tests conducted during experimentation regarding the invention.

A series of tests was conducted to determine if mink enteritis virus would grow and produce cytopathic changes in kitten kidney tissue culture. Three tests from this series are set forth below.

TEST 1

Kitten kidney tissue cultures were prepared according to standard procedure and propagated in Earl's balance salt solution, 10% calf serum, 0.25% lactalbumin hydrolysate, 1% stock antibiotic (penicillin and streptomycin), 2% stock sodium bicarbonate medium. One week later the cells were infected with mink enteritis virus seed stock. Medium comprising Earl's balance salt solution, 3% calf serum, 0.25% lactalbumin hydrolysate, antibiotic and 3% sodium bicarbonate was added after infecting the kitten kidney tissue culture.

Results: The mink enteritis virus infected kitten kidney tissue cultures showed marked cytopathic effects in 24 hours. The fluids were harvested two days after cell infection.

TEST 2

Kitten kidney tissue cultures were prepared according to standard procedure and infected with the tissue culture passaged mink enteritis virus seed stock harvested in Test 1 above. The kitten kidney tissue cultures were fed with Earl's balance salt solution, 3% calf serum, 0.25% lactalbumin hydrolysate, 1% stock antibiotic and 6% stock sodium bicarbonate medium after infection.

Results: The mink enteritis virus infected kitten kidney tissue cultures showed cytopathic effects. The fluids were harvested.

TEST 3

Kitten kidney tissue cultures were prepared according to standard procedure. Cells were grown out at 39° C. in medium 199, 10% fetal calf serum, 1% stock antibiotic and 1% stock sodium bicarbonate. The kitten kidney tissue cultures were infected with tissue-cultured mink enteritis virus seed stock. The fluids were harvested 45 hours after infection as Lot 1. A one to ten dilution of these fluids were inoculated into kitten kidney tissue culture and harvested 48 hours later as Lot 2. These fluids were then diluted one to ten and inoculated into kitten kidney tissue culture and harvested 48 hours later as Lot 3. These fluids were again diluted one to ten and inoculated into secondary passage kitten kidney tissue culture and harvested 48 hours later as Lot 4. The fluids were titrated by the fluorescent antibody procedure.

Results: The mink enteritis virus content of the infected kitten kidney tissue culture fluids were as follows:

|  | Per ml. |
| --- | --- |
| Lot 1 | $10^5$ |
| Lot 2 | $10^5$ |
| Lot 3 | $10^4$ |
| Lot 4 | $10^4$ |

The culture fluids were negative for pleuropneumonia and other contaminants.

TEST 4

The objective of this test was to determine if inactivated tissue-culture propagated mink enteritis virus would protect mink against challenge with mink enteritis virus.

Mink enteritis virus propagated in kitten kidney tissue culture were inactivated by adding 0.05 ml. of formaldehyde to 10 ml. of tissue-culture fluids and incubated at 37° C. A 0.35 ml. solution of 20% alum potassium adjuvant was added to the 10 ml. of tissue culture fluids together with 0.12 ml. of 4 N NaOH to bring the pH to 7. The inactivated tissue culture fluids were then incubated at 37° C. for 24 hours. Three kits from a litter of six were inoculated subcutaneously with the inactivated tissue-cultured vaccine. The other three kits were inoculated subcutaneously each with one ml. of one to ten dilution of the inactivated tissue-cultured vaccine. The mink were challenged orally with mink enteritis virus three weeks after vaccination. A virus titration of the infective tissue culture fluids were performed in the mink.

Results: Two of the three mink vaccinated with the inactivated tissue-culture fluids resisted challenge. The three mink that were vaccinated with the one to ten dilution of the tissue-culture fluids developed clinical mink virus enteritis after challenge. The three non-vaccinated controls also developed clinical mink virus enteritis five and six days after being fed the challenge virus.

The virus titration results for the live virus tissue culture fluids in mink are depicted below:

| Virus dilution: | Observation |
| --- | --- |
| $10^{-3}$ | Both mink developed clinical enteritis on day 5. |
| $10^{-4}$ | One of two mink developed clinical enteritis on day 12 and recovered. |
| $10^{-5}$ | No signs of enteritis. |

The titer of the tissue-culture infective for mink would be $10^{-4}$ per ml. Mink in the $10^{-4}$ and $10^{-5}$ dilutions were challenged with mink enteritis virus and all mink developed clinical signs of virus enteritis.

TEST 5

The object of this test was to determine which tissue culture of fetal kitten organs produces the highest titer of mink enteritis virus.

Fetal kitten tissue cultures were prepared from kidney, heart, lung, thymus, intestine and placental cells according to standard procedure. Medium was 199, 10% calf serum, 1% stock antibiotic and 0.25% stock sodium bicarbonate. The intestinal, thymus and placenta tissue cultures were infected with one to ten dilution of Lot 4 from Test 4 above. The heart, kidney, lung and intestinal tissue cultures were infected with Lot 1 from Test 4 above. These cultures were grown out in 199, 10% fetal calf serum, 1% stock antibiotic, 0.5% stock sodium bicarbonate.

Results: The cytopathic changes in the various fetal kitten tissue cultures were as follows:

| Tissue culture: | Observation |
|---|---|
| Placental | No cytopathic effect (CPE). |
| Thymus | CPE observed by sixth day. |
| Intestinal (calf serum) | CPE observed by sixth day. |
| Intestinal (fetal calf serum) | 70–80% CPE on second day. |
| Kidney | 70–90% CPE on second day. |
| Lung | 80–90% CPE on second day. |
| Heart | 60–70% CPE on third day. |
| Thymus (fetal calf serum) | 10–20% CPE on third day. |

The fetal kitten tissue culture organ propagated mink enteritis virus were titrated and the virus titer determined by cytopathic effect was as follows:

| Tissue culture: | Observation |
|---|---|
| Lung | $10^{-3}$ cytopathic effect (CPE) titer. |
| Intestine | $10^{-3}$ CPE titer. |
| Heart | $10^{-3}$ CPE titer. |
| Thymus | $10^{-3}$ CPE titer. |

The true virus titer of the fluids as determined by the fluorescent antibody procedure would be approximately two logs higher than the cytopathic effect liter, thus, these fluids had approximately an equivalent titer of $10^{-5}$ $ID_{50}$ per ml. The medium used as nutrients for these infected culture contained fetal calf serum. The cultures of thymus and intestine that developed only fleeting cytopathic effect observed on day six were fed medium containing calf serum.

TEST 6

The object of this test was to determine the amount of tissue culture propagated inactivated mink enteritis virus essential for protection of mink against enteritis virus challenge.

Kitten kidney tissue-culture propagated mink virus enteritis fluids with $10^6$ $ID_{50}$ per ml. as determined by the fluorescent antibody procedure were used to prepare an inactivated vaccine. Ten ml. of the fluids were inactivated by adding 0.05 ml. of formaldehyde and 0.35 ml. of 20% alum potassium as adjuvant. The fluids were brought to pH 7 with the addition of 0.09 ml. of 4 N NaOH and placed in the 37° C. incubator to complete the inactivation process. Three mink were inoculated subcutaneously with one ml. each of the inactivated tissue-culture propagated mink enteritis vaccine, another three mink were inoculated subcutaneously with one ml. each of a one to ten dilution of this vaccine and still another group of three mink were inocculated subcutaneously with one ml. each of a one to one hundred dilution of the vaccine. The mink were challenged orally with mink enteritis virus two months later.

Results: All the mink inoculated with the killed vaccine or the dilutions thereof were protected against the challenge. Non-vaccinated control mink from the same herd were susceptible to mink enteritis virus.

TEST 7

The object of this test was to produce quantity batches of tissue-culture mink enteritis virus fluids, prepare inactivated vaccine from the fluids and determine the efficacy of the killed vaccine in mink.

Four batches of kitten kidney tissue-culture propagated mink enteritis virus were selected for preparation of killed vaccine. The quantity of mink enteritis virus per ml. as determined by the fluorescent antibody procedure were as follows for the four batches:

| | $ID_{50}$ per ml. |
|---|---|
| Batch 1 | $10^3$ |
| Batch 2 | $10^5$ |
| Batch 3 | $10^4$ |
| Batch 4 | $10^4$ |

Five hundred ml. of the fluids of each batch were inactivated with 0.4% formaldehyde and incubation at 37° C. Precipitated botulinum toxoid from equivalent volume was added to the fluids, the alum potassium to act as adjuvant, to form a combination vaccine. The different batches of combination vaccines were inoculated into each mink. Each mink received one ml. dose of vaccine subcutaneously. Two hundred and ninety mink (group 1) were vaccinated with Batch 1. Four hundred and seventy-six mink (group 2) were vaccinated with Batch 2. Four hundred and six mink (group 3) were vaccinated with Batch 3. Four hundred and eighty mink (group 4) were vaccinated with Batch 4. Ten-fold dilutions were made of each batch and inoculated into groups of six mink each. Twenty mink each from groups 2, 3 and 4 and ten mink from group 1 were challenged orally with virulent mink enteritis virus about 2 weeks later. Two mink from each of groups 1–4 were inoculated with dilutions of the vaccine Batches 1–4 were also challenged orally with virulent mink enteritis virus.

Results: The data obtained from these challenges are presented in Table I.

TABLE I.—RESISTANCE OF MINK VACCINATED WITH TISSUE CULTURE PROPAGATED KILLED MINK ENTERITIS VACCINE TO ORAL CHALLENGE

| Vaccine batch: | Virus quantity | Observations [1] |
|---|---|---|
| 1 | $10^3$/ml | 1/10 |
| | $10^2$/ml | 1/2 |
| 2 | $10^5$/ml | 0/20 |
| | $10^4$/ml | 1/2 |
| | $10^3$/ml | 0/2 |
| 3 | $10^4$/ml | 0/20 |
| | $10^3$/ml | 0/2 |
| | $10^2$/ml | 0/2 |
| 4 | $10^4$/ml | 0/20 |
| | $10^3$/ml | 0/2 |

[1] Numerator—number of mink developing clinical enteritis. Denominator—number of mink in group challenged.

The vaccines prepared from Batches 2, 3 and 4 stimulated complete protection in mink against challenge with virulent mink enteritis virus. The vaccine prepared from Batch 1 produced resistance to the virus challenge in 90% of the vaccinated mink. By combining the figures of all four vaccines for each virus quantity group the 80% protection dose is determined as $10^{2.75}$ $ID_{50}$ virus particles per ml. The kitten kidney tissue culture propagated killed mink enteritis virus vaccine was demonstrated to be an effective vaccine for protecting mink against mink enteritis virus challenge.

It is understood that the present invention is not limited to the particular embodiments or methods herein described, but embraces all such modified forms thereof as come within the scope of the following claims.

I claim:
1. The method of propagating mink enteritis virus in heterologous domestic cat kitten tissue culture, eliminating extraneous homologous mink tissue antigens, comprising the steps of:
  (a) preparing a tissue culture suspension from the trypzinized viscera of a healthy domestic cat kitten,
  (b) incubating said domestic cat kitten tissue culture suspension until the cells are at least about 50 percent grown out,
  (c) planting mink enteritis seed virus, obtained from infected mink tissue collected from an infected mink after clinical signs of disease occur in an otherwise healthy susceptible mink which has been previously infected with mink enteritis virus, having a virus concentration of about $10^4$ to $10^6$ $ID_{50}$ per ml. in the tissue culture,
  (d) incubating the mink enteritis infected domestic cat kitten tissue culture at least until marked cytopathic effects are shown, and

(e) collecting the mink enteritis virus containing fluids from the domestic cat kitten tissue culture at 1 to 6 day intervals after cell infection, between secondary passages.

2. The method of propagating mink enteritis virus as specified in claim 1 wherein the tissue culture suspension is prepared from trypsinized cells of fetal kitten tissue of a domestic cat kitten in which cytopathic effects can be determined.

3. The method of propagating mink enteritis virus as specified in claim 2 wherein step (b) the tissue culture suspension is incubated at about 37° C. for about 3 to 4 days.

4. The method of propagating mink enteritis virus as specified in claim 2 wherein step (c) the mink enteritis seed virus is seeded at a concentration of about 1 ml. per 3 ml. of the tissue culture.

5. The method of propagating mink enteritis as specified in claim 2 wherein the tissue culture is fed with growth medium including animal serum which is non-inhibitory to mink enteritis virus growth.

6. The method of propagating mink enteritis virus as specified in claim 2 wherein the tissue culture is fed with growth medium including animal serum selected from a group consisting of fetal calf serum and lamb serum.

7. The method of propagating mink enteritis virus as specified in claim 2 wherein the mink enteritis virus containing fluids may be collected from the infected tissue culture in about one to six days after planting of the seed virus.

8. The method of producing mink enteritis vaccine from the virus obtained from the method of claim 2 including the steps of inactivating the virus with 0.3% formaldehyde, incorporating 0.7% potassium alum adjuvant therewith, and adjusting the pH of the virus to about 7.0.

9. The potassium alum-adjuvanted, formaldehyde inactivated tissue-culture propagated mink enteritis virus having a pH of about 7.0 and $ID_{50}$ of at least $10^{2.75}$ virus particles per mil obtained in accordance with the method of claim 8.

10. A combination product vaccine, comprising botulin toxoid admixed in potassium alum adjuvanted, formaldehyde inactivated domestic cat kitten tissue culture propogated mink enteritis virus vaccine having $ID_{50}$ of at least $10^{2.75}$ virus particles per ml. and having the pH adjusted to about 6.0, obtained in accordance with the method of claim 8.

References Cited
UNITED STATES PATENTS 3,293,130   12/1966   Slater et al. _____ 424—89

OTHER REFERENCES

Derwent, Pharmdoc #28149 (Wellcome Foundn., Ltd., Neth., 6702396, Pub. Aug. 21, 1967), pp. 95–102, Book No. 653, issued Sept. 12, 1967—in Posl Oct. 4, 1967, Posl R 710 D4.

Pridham et al. J.A.V.M.A. 135(5): 279–282, Sept. 1, 1959, "The Preparation of Virus Enteritis in Newly Weaned Mink Kits by the use of an Homologous Tissue Vaccine".

SHEP K. ROSE, Primary Examiner

U.S. Cl. X.R.

195—1.1, 1.2, 1.3, 1.4, 1.5, 1.7, 1.8